Jan. 12, 1943.   F. MARKWICK   2,308,093
ANTISKID DEVICE
Filed Feb. 2, 1942   2 Sheets-Sheet 1
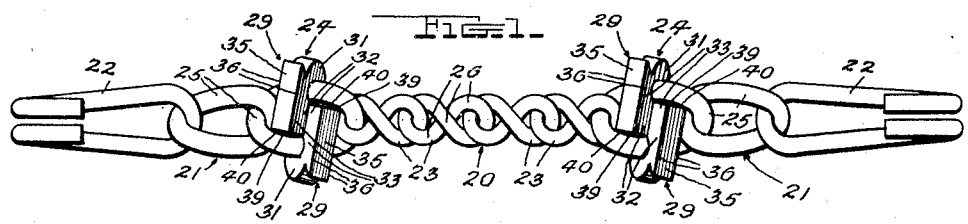
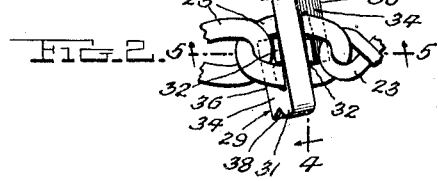
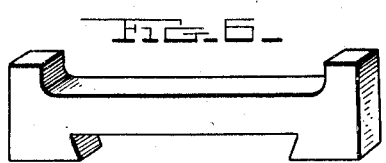
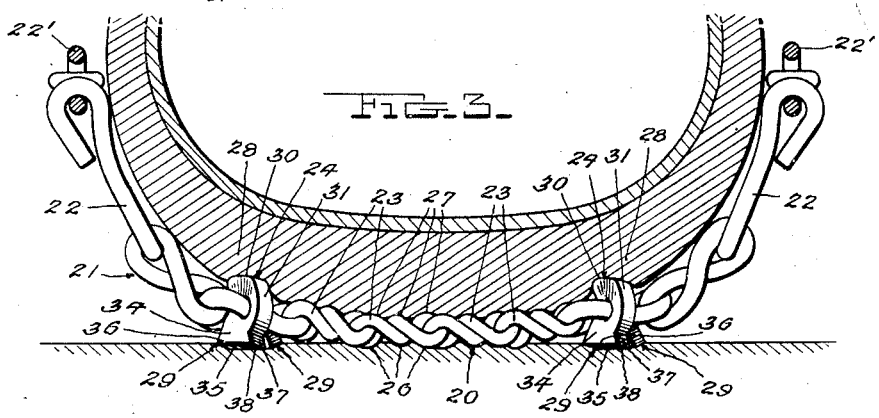
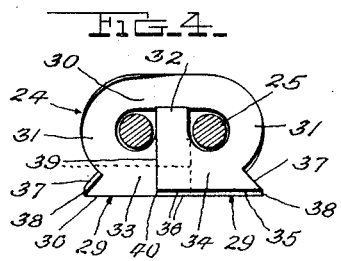
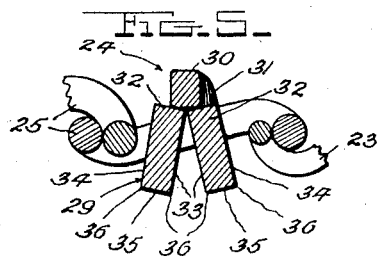
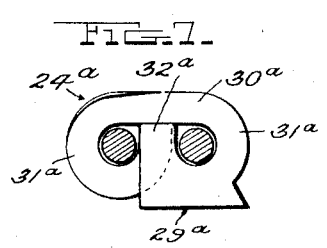
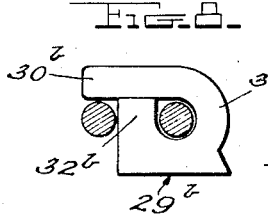
Inventor
F. Markwick
By H. B. Wilson &Co.
Attorneys Jan. 12, 1943.  F. MARKWICK  2,308,093
ANTISKID DEVICE
Filed Feb. 2, 1942  2 Sheets—Sheet 2
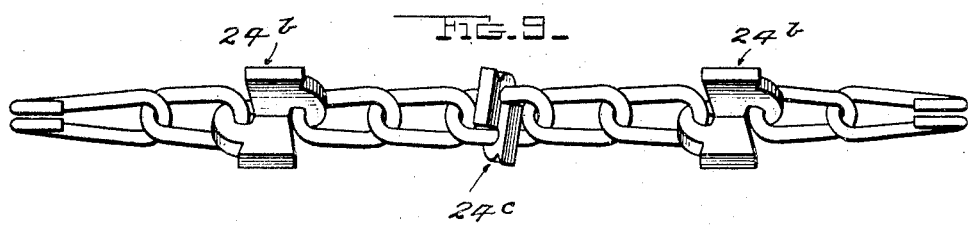
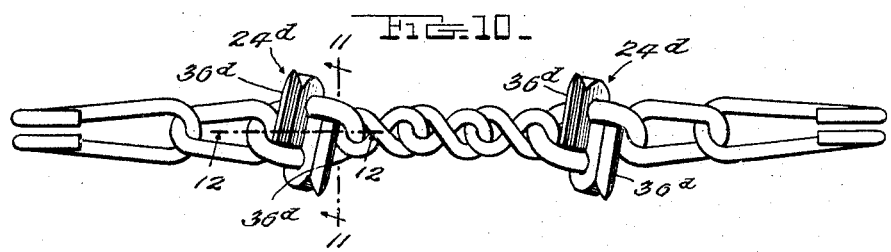
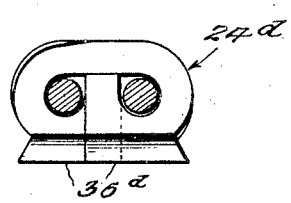
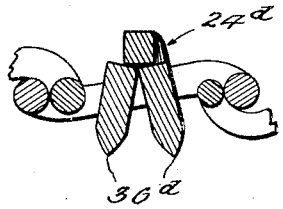
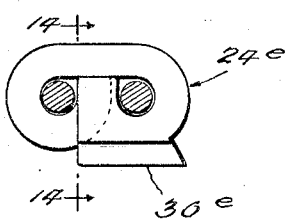
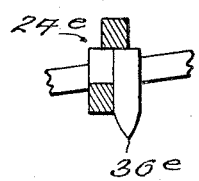
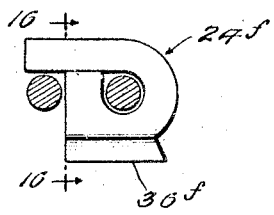
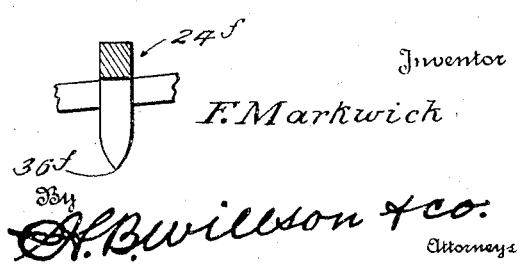
Inventor
F. Markwick
By H.B.Willson &Co.
Attorneys Patented Jan. 12, 1943

2,308,093

UNITED STATES PATENT OFFICE 2,308,093

ANTISKID DEVICE

Frederick Markwick, Falls, Pa.

Application February 2, 1942, Serial No. 429,327

12 Claims. (Cl. 152—243)

The invention aims to so improve upon the construction of tire chains as to insure much safer driving on slippery roads, particularly on ice and ice-like hard-packed snow, although the improved chains are of course useable also on frozen ground and in mud, and under all circumstances requiring some sort of chain.

When driving on slippery surfaces, not only is it essential to obtain non-slip engagement of wheels and road for driving and braking purposes, but adequate provision should be made to prevent not only forward skid but side-skid, the latter of which is the greatest hazard and often results in the most serious accidents. In endeavors to attain the desired results, numerous anti-skid devices have been produced having calks carried by the central portions of cross chains connected with conventional side chains. For slow driving, some of these devices are practicable but at higher speeds, they cause the cross chains to throw excessively outward from the wheels under the action of centrifugal force, with the result that the calks and cross chains strike terrific blows upon the hard road, to their serious detriment, and all of them cause severe bumping of the wheels on the road, and such bumping adds to the danger, as the wheels are almost out of contact with the road a great deal of the time. Then too, with such devices, if a forcible side skid starts, the calks do their part to arrest it, but the tires slide lengthwise of the cross chains. There is of course a limit to this sliding if no part of the chain fails, but it permits the car to gain lateral momentum and the force of this momentum is often greater than the resistance of the chains, frequently resulting in chain breakage but more frequently in straightening-out of some of the cross chain hooks, freeing the affected cross chains from one of the side chains. In either case, the skid is often stopped too late, if at all, and moreover, the damaged chains frequently injure brake rigging, fenders, or other parts of the car.

In years of experimentation, I have rigidly tested numerous types of anti-skid chains under various hazardous road conditions, and even under circumstances approaching the driving habits of extremely reckless drivers, and I have found that there never has been a chain available on the market which would give such protection as that which the purchaser had a right to expect, and moreover, those available added falsely to the driver's confidence and, therefore, became a hazard. Even my own chain shown in U. S. Patent 1,681,125 of August 14, 1928, while considered the safest chain by numerous drivers during thousands of miles of use, notably motor police in the United States and Canada, and rural mail carriers, is not perfect, for the central portions of the cross chains carry the anti-skid links with the drawback above explained, and constant yielding of the anti-skid links and their bights is permitted during use, sometimes resulting in crystallization and breakage.

It has been to provide a non-skid chain of maximum safety and overcoming all prior deficiencies, that the present invention has been devised, and hundreds of miles of accident-free driving over icy and other hazardous roads, again notably by motor police and rural mail carriers, have proven that the desired end has been attained.

Figure 1 of the accompanying drawings is a road-side elevation of one of the improved cross chains.

Figure 2 is a tire-side elevation of a fragment of the cross chain shown in Fig. 1.

Figure 3 is a transverse sectional view through a tire equipped with chains, the cross chains of which are constructed as shown in Figs. 1 and 2.

Figures 4 and 5 are respectively sectional views on the lines 4—4 and 5—5 of Fig. 2.

Figure 6 is a perspective view of a metal blank from which the calked anti-skid links shown in the preceding views, may be constructed.

Figures 7 and 8 are views similar to Fig. 4 but showing simplifications.

Figure 9 is a road-side elevation illustrating a differently constructed cross chain.

Figure 10 is a view similar to Fig. 1 but showing different calks.

Figures 11 and 12 are respectively sectional views on the lines 11—11 and 12—12 of Fig. 10.

Figure 13 is a view similar to Fig. 11 but showing a simplification.

Figure 14 is a detail section on line 14—14 of Fig. 13.

Figure 15 is a view similar to Fig. 13 but showing a still further simplification.

Figure 16 is a detail section on line 16—16 of Fig. 15.

The cross chain shown in Figs. 1 to 5, inclusive, comprises an intermediate portion 20, end portions 21, hooks 22 for attaching said end portions to conventional side chains 22', and two non-skid links 24 carried by the innermost links of the end portions 21. Each of the intermediate links 23 is relatively light and constructed from stock of comparatively small diameter; and each link 25 of the end portions 21, is relatively heavy and formed from stock of comparatively large diameter. The anti-skid links 24 carried by the innermost of these links 25 are rather heavy, and their weight plus the weight of the links 25 tends to prevent excessive throwing of the relatively light intermediate chain portion 20 away from the tire, in use. Obviously, the links 25 and 24 have a tendency to occupy the planes occupied by the side chains 22' during rotation of the wheel, under the action of centrifugal force. The relatively light intermediate chain portion 20 also has a tendency to fly out by centrifugal force, but the tendency of the aforesaid links 24 and 25 to move into the planes of the side chains 22', has a tendency to pull upon the ends of said intermediate portion 20 with the result that said intermediate portion 20 is kept relatively straight and taut. Thus, it will not throw excessively from the tire. Moreover, as it is constructed from stock of relatively small diameter, the tire can obtain a better grip on it than it could on conventional links, and then too, the intermediate links 23 may be more readily forced into the road whenever the surface of the latter permits. Furthermore, the intermediate links may become further forced into the tire tread than if they were formed of larger stock and there is thus less bumping of the wheel upon the road.

It is preferable that each one of the intermediate links 23 be given a half twist, for this provides each one of these links with three points of contact 26, with the roadway and provides similar points 27 for contact with the tire tread. To overcome the necessity of a great multiplicity of numerals on the drawings, the contact points 26 are indicated only on one link in Figs. 1 and 3.

The non-skid links 24, positioned at the ends of the intermediate chain portion 20, underlie the margins 28 of the tire tread, and each of said links 24 includes two sharp-edged calks 29 which extend transversely of the links 25 on which said links 24 are mounted. Each non-skid link 24 also includes a rib or key on the tire side of the cross chain and extending transversely of said cross chain to bite into the resilient marginal portions 28 of the tire tread under the weight of the car and its load. Should a side skid start or should the tire exert any force on the cross chain tending to slide the latter crosswise of the road, the sharp-edged calks 29 either prevent or arrest such a skid, and the tire tread is prevented from sliding lengthwise of the cross chain by the aforesaid ribs or keys on the tire side of said cross chain. The tire is thus virtually locked to the road and safe control of the car may be had. The calks so tenaciously connect the cross chain with the road as to insure proper traction and braking actions.

Each anti-skid link 24 includes a calk-carrying bar 30 extending transversely of the link 25 which carries said non-skid link, said bar 30 contacting with the side members of said link 25 and being preferably of rectangular cross section with slightly rounded corners. This bar forms the above mentioned rib or key at the tire side of the cross chain and it may tenaciously bite into the tire tread without injuring same. At the side of the link 25 opposite the bar 30, are the calks 29, these calks being substantially in contact with the side members of said link 25. Two bights 31 integrally join the outer ends of the calks 29 with the ends of the bar 30 and extend around the outer edge portions of the link 25. Two lugs 32 are integral with the inner ends of the calks 29, said lugs 32 extending between the side members of the link 25 and having free ends which solidly abut the central portion of the bar 30. Each of the lugs 32 is substantially in contact with the inner opposed sides of the side members of the link 25. The lugs 32 thus cooperate with the bights 31 in transmitting thrusts from the chain to the non-skid link and vice versa. Moreover, these lugs 32 integral with the inner ends of the calks 29 and abutting the bar 30, solidly connect said inner ends of said calks with said bar and thus prevent springing of the bights 31 during operation, thus preventing crystallizing and breaking of said bights.

The inner ends of the two calks 29 are in overlapping relation with each other and their inner sides 33 preferably diverge outwardly away from the cross chain, as shown. Each calk 29 is by preference formed with a flat outer side 34 parallel with the inner side 33, and each calk is provided with a tread edge 35 at right angles to the sides 33 and 34 and cooperating therewith in forming sharp edges 36. The outer end surface 37 of each calk 29 is acute to the tread edge 35 and coacts therewith in forming an outwardly facing sharp edge 38. The inner end surface 39 of each link 29 is preferably at about right angles to the tread edge 35 and coacts therewith in providing another sharp edge 40. In addition to these various sharp edges 36, 38 and 40, additional sharp edges are provided by having the end surfaces 37 and 39 at about right angles to the calk sides 33 and 34. Then too, the portions of the bights 31 adjacent the calks 29 may have sharp edges or corners, and all of the described edges and corners insure that there shall be no appreciable degree of slip of the calks on even a hard icy pavement, as long as the calks remain sharp.

In Fig. 7, an anti-skid link 24ª is shown which is similar to the link 24 above described, but possesses only one calk 29ª. The bights 31ª correspond to the bights 31 above described, one of these bights integrally joins the outer end of the calk 29ª to the bar 30ª, and the other end of said calk is provided with an integral lug 32ª corresponding to the lug 32. The other of the bights 31ª simply continues through the cross chain link and abuts the bar 30ª at one side of the lug 32ª.

In Fig. 8, the bar 30ᵇ corresponds to the bar 30ª with the bight 31ª at the left of Fig. 7 omitted. The elements 29ᵇ, 30ᵇ, 31ᵇ and 32ᵇ correspond to the elements 29, 30, 31 and 32, and to the elements 29ª, 30ª, 31ª and 32ª, above described. Obviously, the non-skid links as shown in Figs. 7 and 8 may be applied in the same locations as the links 24, or if desired, they may be applied to conventional cross chains at desired locations.

In Fig. 9, a cross chain is shown having two of its longitudinal links formed by two anti-skid links 24ᵇ which are very similar to the links 24 above described. If desired, a third and similar link 24ᶜ could be placed at the center of the chain.

In Figs. 10, 11 and 12, the cross chain is a virtual duplicate of the chain shown in Figs. 1 and 3, but it has fewer intermediate links. The anti-skid links 24ᵈ are very similar to the links 24 but their calks are ground or otherwise shaped so that each one has a V-shaped outer edge 36ᵈ instead of having two edges such as 36 above described.

In Figs. 13 and 14, the non-skid link 24ᵉ is very similar to the link shown in Fig. 7 but it has only one sharp outer edge 36ᵉ.

In Figs. 15 and 16, the non-skid link 24ᶠ is quite similar to the link shown in Fig. 8, but here again the calk is provided with only one sharp outer edge 36ᶠ.

Any of the non-skid links may be forged from suitable stock or may be bent from a blank struck out with appropriate dies. During the final shaping of the link under heat, it is bent into position around the link or links which it is to engage, and the necessary hardening may be obtained where required by tempering, or if desired, other hardening treatments may be used or hard metal welded onto the calks at desired points. The invention is, of course, not restricted to any such mechanical expedients.

As an example of one way in which the link 24 of Figs. 1 to 5 may be constructed, I illustrate a metal blank formed with appropriate dies or by forging and in readiness to be heated and bent into shape. (See Fig. 6.)

I have found that any of the non-skid links will better withstand the blows which they receive in use, if they be mounted on their carrying link or links with some degree of looseness. It is, therefore, preferable to do this, as indicated by the drawings.

From the foregoing taken in connection with the accompanying drawings, it will be seen that novel and advantageous provision has been made for carrying out the object of the invention, and while preferred features have been illustrated, it is to be understood that numerous variations may be made within the scope of the invention as claimed. Moreover, it will be clear that I am not restricted as to size, proportions, materials, etc.

I claim:

1. In an anti-skid device having a conventional elliptical cross chain link provided with the usual spaced side members; a calk-carrying bar transversely spanning said conventional elliptical link at the tire-side thereof and contacting with said link side members, said calk-carrying bar projecting beyond the tire-side of the cross chain and having a longitudinal edge to engage the tire tread to prevent the tire from sliding toward an end of the cross chain, a sharp-edged calk extending transversely of one of said link side members at the road-side thereof, a second sharp edged calk extending transversely of the other of said link side members at the road-side thereof, the inner ends of the two calks being disposed in overlapped relation with each other, two bights engaging said side members and integrally joining the outer end sof said calks with the ends of said calk-carrying bar respectively, and two lugs integral with said overlapped inner ends of said calks respectively, said lugs extending between said side members of said conventional elliptical link and each being substantially in contact with the inner opposed sides of said link side members, said lugs having free ends solidly abutting the road-facing side of said calk-carrying bar, said bights and lugs preventing movement of both ends of said calks toward said bar.

2. A structure as specified in claim 1; the sharp edges of said calks being elongated and extending transversely of said side members of said conventional elliptical link, and being spaced apart longitudinally of said side members.

3. A structure as specified in claim 1; each of said calks having substantially parallel inner and outer sides extending longitudinally of said calk-carrying bar, a tread edge at substantially right angles to said inner and outer sides and coacting therewith in forming two sharp corners, an outer end surface at an acute angle to said tread edge and coacting therewith in forming a third sharp edge, and an inner end surface at an angle to said tread edge and coacting therewith in forming a fourth sharp corner, said inner and outer end surfaces being disposed at substantially right angles to said inner and outer sides and coacting therewith in forming four adittional sharp edges, the inner sides of the two calks diverging away from said bar.

4. In an anti-skid device having a conventional elliptical cross chain link provided with the usual spaced side members; a calk-carrying bar transversely spanning said conventional elliptical link at the tire-side thereof and contacting with said link side members, said calk-carrying bar projecting beyond the tire-side of the cross chain and having a longitudinal edge to engage the tire tread to prevent the tire from sliding toward an end of the cross chain, a sharp-edged calk extending transversely of one of said link side members at the road-side thereof, a bight integrally joining one end of said calk with the corresponding end of said calk-carrying bar, and a lug integral with the other end of said calk, said lug extending between said side members of said conventional elliptical link and being substantially in contact with the inner opposed sides of said side members, said lug having a free end solidly abutting the road-facing side of said calk-carrying bar, said bight and lug preventing movement of either end of said calk toward said bar.

5. In an anti-skid link, a calk-carrying bar, a sharp-edged calk at and spaced from one side of said bar and extending longitudinally thereof, a bight integrally joining one end of said calk with one end of said bar, and a lug integral with the other end of said calk and having a free end solidly abutting said one side of said bar; said bight and lug cooperating with said bar and calk in providing an eye to receive a portion of a chain link, and in solidly holding both ends of said calk against movement toward said bar, the end of said bar opposite said bight extending beyond said lug to abut a portion of a chain link.

6. In an anti-skid link, a calk-carrying bar, a sharp-edged calk at and spaced from one side of said bar and extending longitudinally thereof, a bight integrally joining one end of said calk with one end of said bar, and a lug integral with the other end of said calk and having a free end solidly abutting said one side of said bar; said bight and lug cooperating with said bar and calk in providing an eye to receive a portion of a chain link, and in solidly holding both ends of said calk against movement toward said bar, the end of said bar opposite said bight extending beyond said lug to abut a portion of a chain link and having a bight to engage the same, this bight terminating in a lug having a free end which abuts said side of said bar.

7. An anti-skid link comprising a bar, two sharp-edged calks at and spaced from one side of said bar and disposed in overlapped relation with each other, two bights integrally joining the outer ends of said calks with the ends of said bar respectively, and two lugs integral with the inner ends of said calks respectively, said lugs having free ends solidly abutting the central portion of said side of said bar; said bights and lugs cooperating with said bar and calks in providing eyes to receive chain link portions, and in solidly holding both ends of said calks against movement toward said bar.

8. An anti-skid link comprising a bar, two sharp-edged calks at and spaced from one side of said bar and disposed in overlapped relation with each other, two bights integrally joining the outer ends of said calks with the ends of said bar respectively, and two lugs integral with the inner ends of said calks respectively, said lugs having free ends solidly abutting the central portion of said side of said bar; said bights and lugs cooperating with said bar and calk in providing eyes to receive chain link portions, and in solidly holding both ends of said calks against movement toward said bar, said overlapped calks diverging from each other away from said bar.

9. A structure as specified in claim 8; each of said overlapped calks having substantially parallel inner and outer sides extending longitudinally of said calk-carrying bar, a tread edge at substantially right angles to said inner and outer sides and coacting therewith in forming two sharp corners, an outer end surface at an acute angle to said tread edge and coacting therewith in forming a third sharp edge, and an inner end surface at an angle to said tread edge and coacting therewith in forming a fourth sharp corner, said inner and outer end surfaces being disposed at substantially right angles to said inner and outer sides and coacting therewith in forming four additional sharp edges.

10. A cross chain for a tire chain comprising inter-connected links, hooks connected with the endmost of said links for attachment to side chains, and sharp-edged non-skid links secured to two of said inter-connected links, said non-skid links being located to underlie the marginal portions of a tire tread, the road-side of each of said non-skid links being provided with a sharp-edged side-skid-preventing-calk, the tire-side of each of said non-skid links being provided with a key extending transversely of the cross chain and projecting inwardly beyond the tire-engaging sides of said inter-connected links, said keys having longitudinal edges to engage the tire tread and hold same against sliding toward either end of the cross chain, the intermediate links between said non-skid links being free from encumbrances to reduce bumping and centrifugal throwing away from the tire.

11. A cross chain for a tire chain comprising inter-connected links, hooks connected with the endmost of said links for attachment to side chains, and sharp-edged non-skid links secured to two of said inter-connected links, said non-skid links being located to underlie the marginal portions of a tire tread, the road-side of each of said non-skid links being provided with a sharp-edged side-skid-preventing-calk, the tire-side of each of said non-skid links being provided with a key extending transversely of the cross chain and projecting inwardly beyond the tire-engaging sides of said inter-connected links, said keys having longitudinal edges to engage the tire tread and hold same against sliding toward either end of the cross chain, the intermediate links between said non-skid links being free from encumbrances to reduce bumping and centrifugal throwing away from the tire, each of said intermediate links being formed of smaller stock than and being lighter than any of the rest of said inter-connected links to further reduce bumping and centrifugal throwing away from the tire.

12. A cross chain for a tire chain comprising inter-connected links, hooks connected with the endmost of said links for attachment to side chains, and sharp-edged non-skid links secured to two of said inter-connected links, said non-skid links being located to underlie the marginal portions of a tire tread, the road-side of each of said non-skid links being provided with a sharp-edged side-skid-preventing-calk, the tire-side of each of said non-skid links being provided with a key extending transversely of the cross chain and projecting inwardly beyond the tire-engaging sides of said inter-connected links, said keys having longitudinal edges to engage the tire tread and hold same against sliding toward either end of the cross chain; the intermediate links between said non-skid links being free from encumbrances to reduce bumping and centrifugal throwing away from the tire, each of said intermediate links being formed of smaller stock than and being lighter than any of the rest of said interconnected links to further reduce bumping and centrifugal throwing away from the tire, each of said intermediate links being given a half-twist to provide it with three points of contact with the roadway and the tire.

FREDERICK MARKWICK.